(12) United States Patent
Tyroler et al.

(10) Patent No.: US 7,403,598 B2
(45) Date of Patent: Jul. 22, 2008

(54) REMOTE CONTROL OF A SPEAKER PHONE DEVICE AS A STANDALONE DEVICE OR AS PART OF A SECURITY SYSTEM

(75) Inventors: Dan Tyroler, Great Neck, NY (US); Raymond J. Jordan, Holtsville, NY (US); John D. Tyhacz, Rockville Centre, NY (US)

(73) Assignee: Honeywell International Inc., Morristown, NJ (US)

( * ) Notice: Subject to any disclaimer, the term of this patent is extended or adjusted under 35 U.S.C. 154(b) by 194 days.

(21) Appl. No.: 10/899,835

(22) Filed: Jul. 27, 2004

(65) Prior Publication Data

US 2006/0023847 A1    Feb. 2, 2006

(51) Int. Cl.
*H04M 11/00* (2006.01)
(52) U.S. Cl. .................. 379/37; 379/40; 379/102.01; 379/102.02
(58) Field of Classification Search ............. 379/37–51, 379/110.01, 102.01, 102.02, 102.03, 102.05; 340/531
See application file for complete search history.

(56) References Cited

U.S. PATENT DOCUMENTS

| | | | | |
|---|---|---|---|---|
| 4,918,717 | A | * | 4/1990 | Bissonnette et al. ............ 379/40 |
| 5,305,370 | A | * | 4/1994 | Kearns et al. ................. 379/38 |
| 5,673,304 | A | * | 9/1997 | Connor et al. ................ 379/38 |
| 5,745,849 | A | * | 4/1998 | Britton ........................ 379/39 |
| 5,826,187 | A | * | 10/1998 | Core et al. ............... 455/412.1 |
| 5,995,847 | A | | 11/1999 | Gergen |
| 6,026,150 | A | * | 2/2000 | Frank et al. ............ 379/102.03 |
| 6,240,181 | B1 | | 5/2001 | Tunstall |
| 6,370,233 | B1 | * | 4/2002 | Bennett et al. ................. 379/37 |
| 7,096,001 | B2 | * | 8/2006 | Addy et al. ............... 455/404.1 |

(Continued)

FOREIGN PATENT DOCUMENTS

EP        0 532 826         3/1993

(Continued)

OTHER PUBLICATIONS

"The Polycom SoundStation Premier expandable Conference Phone with remote control!", www.audiolinks.com, printed Jun. 4, 2004.

(Continued)

*Primary Examiner*—Stella L Woo
(74) *Attorney, Agent, or Firm*—Scully, Scott, Murphy & Presser

(57) ABSTRACT

A telephone device such as a speaker phone or message recording device is remotely controlled either as a standalone device or as part of a security system. The telephone device can be controlled by a key fob or other user-operated transmitter that a user actuates to answer a call by speaker phone, end a call, place a call, or control functions of the message recording device such as playing back messages. The key fob transmits a wireless signal that is received and processed by a security system. In response, the security system controls the telephone device. The key fob may control security functions as well. In another approach, the key fob may control the telephone device directly without intervention of a security system. Or, the key fob may control the telephone device via a home automation network.

24 Claims, 6 Drawing Sheets

U.S. PATENT DOCUMENTS

2001/0050976 A1*  12/2001  Simon et al. .................. 379/39
2003/0190906 A1*  10/2003  Winick ........................ 379/37
2004/0086092 A1*   5/2004  Fehr .......................... 379/37

FOREIGN PATENT DOCUMENTS

WO        WO 01/74039  A1   10/2001

OTHER PUBLICATIONS

"A voice activated way to answer the phone!", www.dynamic-living.com/voice_phone.htm, printed Jun. 4, 2004.

"Ademco Lynx R-EN Wireless Home Security System", www.home-technology-store.com/lynxr-en.aspx, printed May 26, 2004.

* cited by examiner

REMOTE CONTROL OF A SPEAKER PHONE DEVICE AS A STANDALONE DEVICE OR AS PART OF A SECURITY SYSTEM

BACKGROUND OF THE INVENTION

1. Field of Invention

The invention relates generally to telephone devices and, more particularly, to a method and apparatus for remotely controlling a telephone device such as a speaker phone or telephone message recording device which is a standalone device or part of a security system.

2. Description of Related Art

Telephone devices such as a speaker phones and telephone message recording devices have become commonplace in home and business settings. The speaker phone allows the user to engage in a hands free conversation. To receive a call on a speaker phone, the user typically presses a function button on the base station or cordless handset to receive the call and activate the speaker phone microphone and speaker. To place a call, the user presses a function button to activate the speaker phone microphone and speaker. When a dial tone is heard, the user enters the telephone number on a keypad. However, the user is required to get up and walk over to the speaker phone to make, receive, or terminate a call. This may not be possible or convenient when the user is far away from the phone, is involved in other tasks, or has limited mobility. As a result, the user can be inconvenienced by missing a call or having a telephone message recording device being unnecessarily activated while trying to answer a call. Similarly, the user is required to get up and walk over to a telephone message recording device to perform functions such as playing back messages, changing the outgoing message, erasing messages, or leaving a voice memo for other family members, for instance.

A solution is needed that allows a user to remotely control a telephone device that addresses the above and other issues. It would further be advantageous to provide a solution that leverages the capabilities of a security system or a home automation network to allow a user to remotely control a telephone device.

BRIEF SUMMARY OF THE INVENTION

The present invention provides the above and other advantages.

In one aspect of the invention, a security apparatus includes at least one control for controlling a security system that secures a building, and at least one receiver for receiving a first signal from at least one sensor in the security system, and for receiving, from a user-operated transmitter, a user-generated signal for controlling a telephone device. The at least one control is responsive to the at least one receiver for triggering an alarm when the first signal is received, and for controlling the telephone device responsive to the user-generated signal.

In another aspect of the invention, a telephone device includes a first control for controlling a telephone function of the telephone device, and a receiver for receiving a first signal from a second control in a security system for securing a building. The second control is responsive to a user-generated signal received from a user-operated transmitter for controlling the telephone function, the first signal is provided by the second control responsive to the user-generated signal, and the first control is responsive to the first signal for controlling the telephone function.

In another aspect of the invention, a user-operated transmitter includes at least one user-actuable component, and a transmitter responsive to the at least one user-actuable component for transmitting a user-generated signal for controlling a telephone device to at least one receiver associated with a security system that secures a building. The at least one receiver is provided for receiving a second signal from a sensor in the security system, and the security system includes at least one control that is responsive to the at least one receiver for controlling the telephone device responsive to the user-generated signal, and triggering an alarm responsive to the second signal.

In another aspect of the invention, a telephone device includes a first control for controlling a telephone function of the telephone device, and a receiver for receiving a first signal from a transceiver via a home automation network. The transceiver is responsive to a user-generated signal received from a user-operated transmitter for controlling the telephone function, and the first control is responsive to the first signal for controlling the telephone function.

In another aspect of the invention, a user-operated transmitter includes at least one user-actuable component, and a transmitter responsive to the at least one user-actuable component for transmitting, to a transceiver associated with a home automation network, a user-generated signal for controlling a telephone function of a telephone device. The transceiver is responsive to the user-generated signal for transmitting a second signal via the home automation network to a receiver associated with the telephone device for controlling the telephone function of the telephone device.

In another aspect of the invention, a telephone device includes a receiver for receiving a wireless signal from a user-operated transmitter for controlling a telephone function of the telephone device, and a control associated with the receiver that is responsive to the wireless signal for controlling the telephone function of the telephone device.

In another aspect of the invention, a user-operated transmitter includes at least one user-actuable component, and a transmitter responsive to the at least one user-actuable component for transmitting, to a receiver associated with a telephone device, a wireless signal for controlling a telephone function of the telephone device. The receiver is responsive to the wireless signal for controlling the telephone function of the telephone device.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
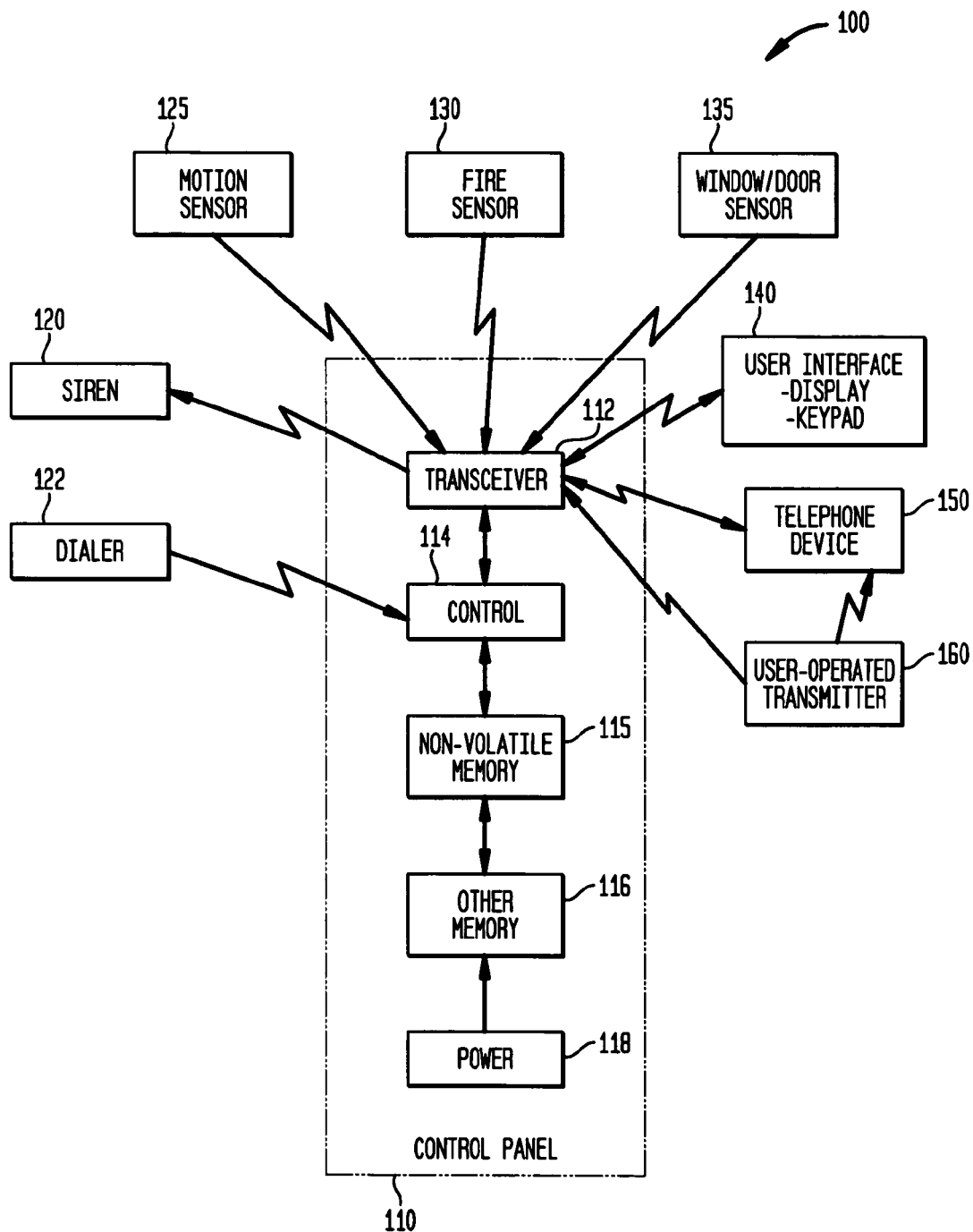
FIG. 1 illustrates an overview of an example security system for providing remote control of a telephone device, according to the invention.

FIG. 1 illustrates an overview of an example security system for providing remote control of a telephone device, according to the invention. Many buildings such as houses, apartments, small businesses and other structures today are secured by security systems that deter intruders and detect fires or other hazards such as carbon monoxide. A security system 100 includes a central control panel 110 that communicates with a number of sensors via a wired or wireless path. For example, the control panel 110 may receive signals from motion sensors 125 that detect when a person enters a room. Signals received from fire sensors 130, such as smoke or heat sensors, indicate that a fire has been detected. Signals received from window and door sensors 135 indicate that a window or door has been opened.

Signals received from a peripheral user interface device 140, e.g., including a keypad and display, may arm and disarm the system, as well as trip an alarm via a panic button feature. The user interface device 140 may be the primary interface between the human user and the security system 100. The user interface device 140 typically includes components that are analogous to the control panel 110, including a control, memory and power source. Optionally, the user interface device 140 includes a transceiver. The user interface device 140 is commonly provided as a wireless device to allow it to be permanently installed in the home without running wire, such as by affixing it to a wall. Or, the user interface device 140 may be a portable unit that can be placed on a table, for instance. Moreover, multiple user interface devices may be provided in a home, such as in different rooms. The control panel 110 generally is a larger component that may be installed in an unobtrusive location in the home, such as a closet or basement. However, it is not necessary for the user interface device 140 to be separate from the control panel 110, or to communicate by wireless signals with the control panel 110. For example, the user interface device 140 may be integrated into the control panel 110. Optionally or additionally, a user interface device may be hardwired to the control panel 110.

Various other components may communicate with the control panel 110, such as a user-operated transmitter 160 that is used to control the security system 100 and/or a telephone device 150, as discussed further below. For instance, the user-operated transmitter may be a handheld portable transmitter such as a key fob transmitter. The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, or whether a specific door or window has been opened. The control panel 110 may also have the ability to notify local emergency services of an alarm condition via a telephone dialer 122 or other means, such as long range radio, cellular telephone, etc.

To facilitate installation and avoid the need to install wiring in a home, wireless security system components may be employed. Some components only transmit or receive. For example, the motion sensors 125, fire sensors 130, and window and door sensors 135 typically only transmit back to the control panel 110 when they are tripped, while the siren 120 only receives a signal from the control panel 110 when the control panel 110 detects an alarm condition based on a signal received from one of the sensors. The user interface device 140 may have both transmit and receive capabilities to communicate with the control panel 110. The wireless security system components may use radio frequency (RF) signals. One system uses signals at 345 MHz to provide a nominal indoor range of 200 feet. Different manufacturers may use different proprietary schemes for communicating data. For example, different coding and modulation techniques may be used.

The control panel 110 may include a local transceiver (transmitter and receiver) 112 for transmitting and receiving wireless signals. Or, the transceiver 112 may be external to the control panel 110, and connected via a wired or wireless path to the control panel 110. The control 114 includes a microprocessor that may execute software, firmware, microcode or the like to implement logic to control the security system 100. The control panel 110 may include a non-volatile memory 115 and other additional memory 116 as required. A memory resource used for storing software or other instructions that are executed by the control 114 to achieve the functionality described herein may be considered a program storage device. A dedicated chip such as an ASIC may also be used. Generally, each wireless component of the security system must be "learned" by the control 114. In the learning process, data is stored in the non-volatile memory 115 that identifies the characteristics of each sensor, including the sensor type, serial number or other identifier, and what type of action to take based on signals received from each sensor. For example, the action may be to provide a status message to the user, store data for subsequent maintenance purposes, or trip an alarm. A power source 118 provides power to the control panel 110 and typically includes a battery backup to AC power.

In accordance with one aspect of the invention, a telephone device 150 such as a speaker phone or message recording device can be controlled by a user via the security system 100. For example, existing wireless communication components and transmitting and receiving protocols of the control panel 110, user interface device 140 and user-operated transmitter 160 can be used to allow a user to control the telephone device 150. The user can answer an incoming telephone call via a speaker phone, end such a call by hanging up the speaker phone line, and dialing a number to place a call using the speaker phone. Any other telephone feature can similarly be controlled, such as call forwarding, hold, conferencing, mute and so forth. Features of a message recording device that can be controlled include playing back messages one at a time, advancing ahead to later messages, erasing messages, recording an outgoing message, and leaving a voice memo for family members in a voice mailbox. Such features are commonly available on current telephone devices but require the user to get up and walk over to the telephone device to access the features by pressing buttons on the telephone device. This can be inconvenient or difficult when a user is involved in a task or has limited mobility, for instance. By enabling the user to access the telephone device via a security system, the functionality of the security system is leveraged and the user's convenience is enhanced.

In another aspect of the invention, the telephone device 150 is remotely controlled directly by the user such as by using the user-operated transmitter 160. In this case, the security system 100 is not used. Generally, the transmitter 160 may be used to control a telephone that is provided, e.g., as an independent standalone device (FIG. 6), a device that is coupled to a security system or home automation network (FIG. 7), or a device that is embedded into a security system (FIG. 8) or home automation network (FIG. 9).

When the security system 100 is used, the user may provide commands in different ways for controlling the telephone device. In one approach, the user presses keys or actuates other user-actuable components on the user-operated transmitter 160 to enter desired commands. In response, the user-operated transmitter 160 sends a wireless user-generated signal, such as an RF or infrared signal, to the transceiver 112 of the control panel 110, using a desired communications protocol, including desired coding and modulation. The communications protocol may be compatible with that already used by the wireless sensors. In a variation, the user-generated signal is received by the user interface device 140 and relayed to the control panel 110. Optionally, the control panel 110 sends a confirmation signal to the user-operated transmitter 160 to confirm that the command has been received. The user-operated transmitter 160 may include a mechanism such as a light or sounder that is activated when the confirmation signal is received to confirm to the user that the user-generated signal has been received. See FIG. 2 and FIG. 3 for further details of the user-operated transmitter 160. In another approach, the user-operated transmitter is the user interface device 140, which allows the user to control the security system 100 as well as the telephone device 150 by pressing keys or actuating other user-actuable components on the user interface device 140 to enter desired commands. See FIG. 4 for further details of the user interface device 140.

The user interface device 140 may include a microprocessor that executes software, firmware, micro-code or the like stored in memory, or a dedicated chip such as an ASIC, to control the security system 100. Thus, the intelligence for controlling the telephone device 150 can be carried out at different locations in the security system 100, such as at the control panel 110 and at one or more peripheral user interface devices 140. For example, the user interface device 140 can send commands to the control panel 110, such as to command the transceiver 112 to transmit a signal to control the telephone device 150. Or, the user interface device 140 can control the telephone device 150 by commanding its own local transceiver to transmit a signal to the telephone device 150.

Figure 2:
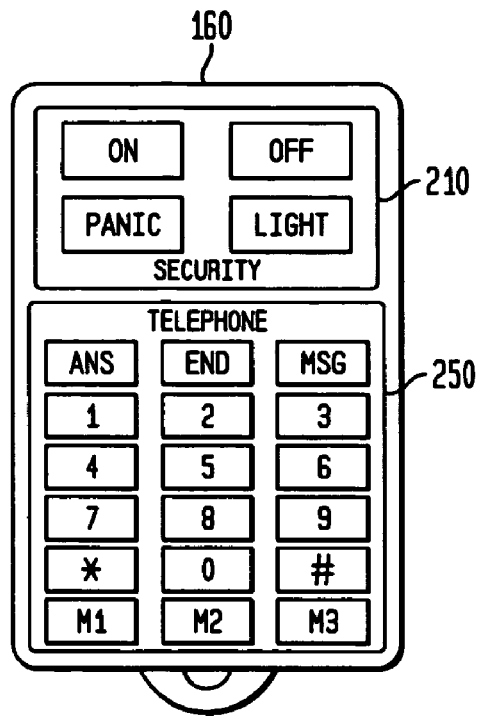
FIG. 2 illustrates an example user-operated transmitter according to the invention.

FIG. 2 illustrates an example handheld user-operated transmitter according to the invention. The user-operated transmitter 160, which is shown as being a key fob transmitter, can be any portable device that can be easily operated by the user. The user-operated transmitter 160 includes a number of user-actuable components such as keys that allow the user to enter desired commands for controlling the telephone device 150 and, optionally, the security system 100. In one approach, the user-operated transmitter 160 includes keys 210 for controlling the security system 100. These keys may include an ON key for arming the security system, an OFF key for disarming the security system, a PANIC key for triggering a panic alarm, and a LIGHT key for turning lights in the home on or off. The user-operated transmitter 160 also includes keys 250 for controlling the telephone device 150. These keys may include an ANS key for answering an incoming call via the speaker phone of the telephone device 150, an END key for ending a call that was made on the speaker phone, and a MSG key for controlling the message recording device. For example, the MSG key may be pressed once to playback messages, twice to record an outgoing message, and three times to leave a voice memo. The keys 250 optionally include a telephone keypad with digits 0-9 for placing a call via the speaker phone by pressing the keys that correspond to a desired phone number to be dialed. Keys M1, M2 and M3 may store phone numbers in memory to allow one-touch dialing. The arrangement shown in FIG. 2 is an example only as various other key configurations may be used. A voice interface may be used as well. Moreover, the user-operated device 160 need not be a key fob but can be any convenient device. For example, the functions of the user-operated device 160 may be incorporated into a television remote control or other device that is found around the home or office, whether the device is portable or not.

Figure 3:
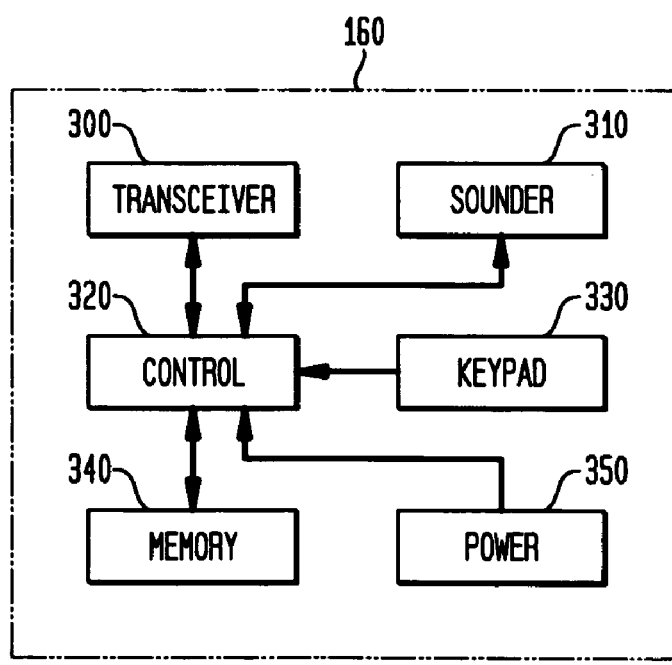
FIG. 3 illustrates an example block diagram of the user-operated transmitter of FIG. 2 according to the invention.

FIG. 3 illustrates an example block diagram of the user-operated transmitter 160 of FIG. 2 according to the invention. The user-operated transmitter 160 includes a keypad 330, such as one that includes keys 210 and 250 as shown in FIG. 2, which allows the user to enter commands for controlling the security system 100 and/or the telephone device 150. A control 320 is responsive to the keypad 330 for controlling a transmitter portion of a transceiver 300 to transmit an encoded wireless control signal via a built-in antenna for controlling the security system 100 and/or the telephone device 150. As discussed below, this user-generated wireless signal can be received at different locations, including the control panel 110, user interface device 140, home automation network 900 (FIG. 9), or directly at the telephone device 150. The transceiver 300 includes a receiver portion for receiving a wireless confirmation signal, e.g., from the security system, home automation network 900, and/or telephone device 150 that confirms receipt of the user-generated signal. The control 320 may activate a sounder 310 and/or a light in response to receipt of the confirmation signal as an indication to the user. Note that optionally the user-operated device 160 includes only a transmitter instead of the transceiver 300 when it is not necessary to receive the confirmation signal.

In one approach, when the control 114 in the security system 100 receives the user-generated signal, the control 114 decodes the data in the received signal to verify that it is from a known source. For example, the user-generated signal may include an identifier of the user-operated device 160. The control 114 compares the received identifier to one or more known identifiers stored in the memory 115 to determine if there is a match. If so, processing of the user-generated signal can proceed. The control 114 knows the identifier and other characteristics of the user-operated transmitter 160 since it is learned into the control 114. The user-generated signal may also be encoded with data for carrying out the commands made by the user via the keypad 330 for controlling the telephone device 150 and/or the security system 100. The control 114 carries out the desired commands. For example, in the security system 100, the control 114 may change a control mode, such as setting an armed mode. The control 114 can also communicate a signal to the telephone device 150 for controlling it as requested by the user via the user-operated device 160. Different techniques for achieving this communication with the telephone device 150 are discussed further below.

Figure 4:
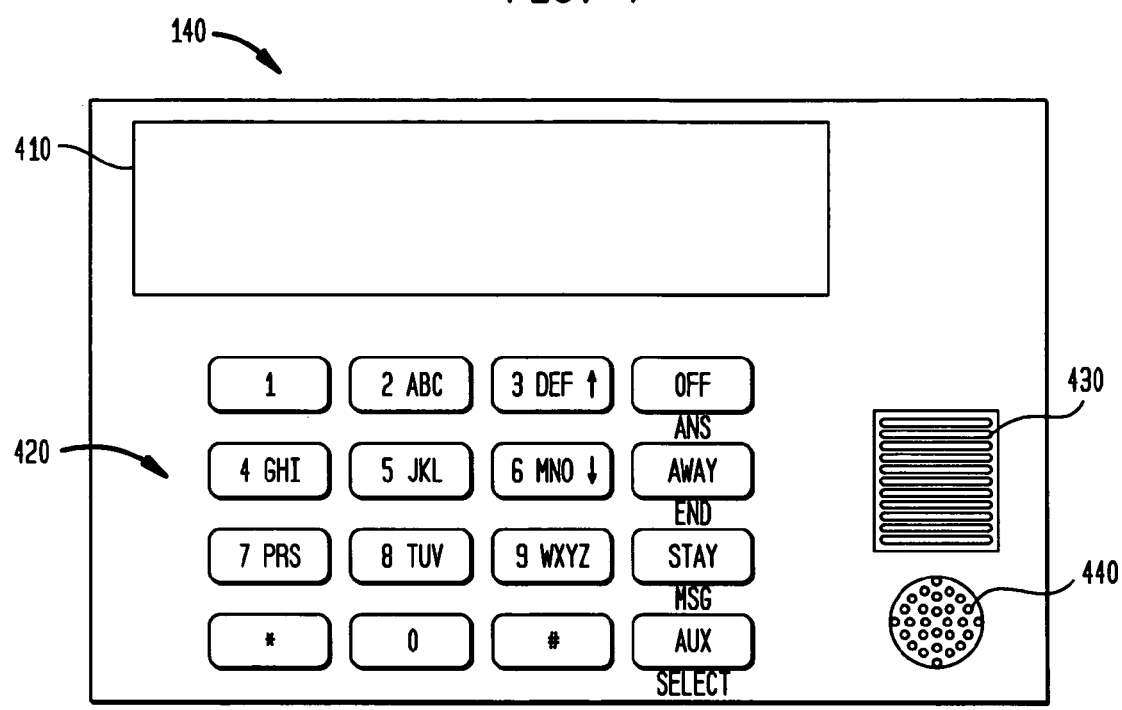
FIG. 4 illustrates an example user interface device according to the invention.

FIG. 4 illustrates an example user interface device according to the invention. As mentioned, the user interface device 140 can be provided, e.g., as a peripheral to the main control panel 110, or as part of the main control panel 110. Thus, the functionality that is described herein as being provided by a user interface device may be provided wholly locally to the device 140, or partially remotely, such as at the associated control panel 110. The user interface device 140 includes a user input component such as a keypad 420 and/or microphone 440 for speech recognition in a voice-activated system, and a user output component such as a display 410 and/or speaker 430. The display 410 may be a multi-line, multi-character LCD display, for instance.

Advantageously, the user interface device 400 may be of the type that is used for controlling a home security system so no re-design, e.g., to provide additional keys on the keypad 420, is necessary to achieve the additional functionality of controlling the telephone device 150. It is also possible to provide the user interface device 140 as a device that is dedicated to controlling the telephone device 150. In one approach, functions can be assigned to existing keys to accommodate the functionality of the present invention. Each key can have more than one function as well by employing double function or soft keys. For example, keys can have functions similar to those of the user-operated device 160 (FIG. 2). Specifically, the "off" key can have the additional function of ANS for answering a call, the "away" key can have the additional function of END for ending a call, the "stay" key can have the additional function of MSG for controlling a message recording device, and the "aux" or "auxiliary" key can have the additional function of "select" to select a pre-set telephone number to dial. Thus, the "off", "away", "stay" and "aux" keys are associated with the conventional security system features, while the ANS, END and MSG keys are associated with the telephone device 150.

In one possible approach, after pressing "select", the display 410 provides a list of the pre-set telephone numbers. The user can scroll through the numbers using the keys in the keypad 420 having an up arrow or down arrow to reach the desired number, then press "select" again to dial the number. Each of the additional functions can be accessed by pressing a "shift" or "function" key or the like, for instance. Note that, optionally, dedicated keys can be provided for controlling the telephone device 150. Any appropriate menu display and logic may be used to achieve the functionality described herein. A voice interface may also be used.

When the user enters the desired commands for controlling the security system 100 and/or telephone device 150, a transmitter associated with the user interface device 140 sends a user-generated signal via a wireless and/or wired path that is encoded with the user-selected command. Generally, the user interface device 140 may include the functionality of the user-operated transmitter 160 as discussed in connection with FIG. 2 and FIG. 3.

Figure 5:
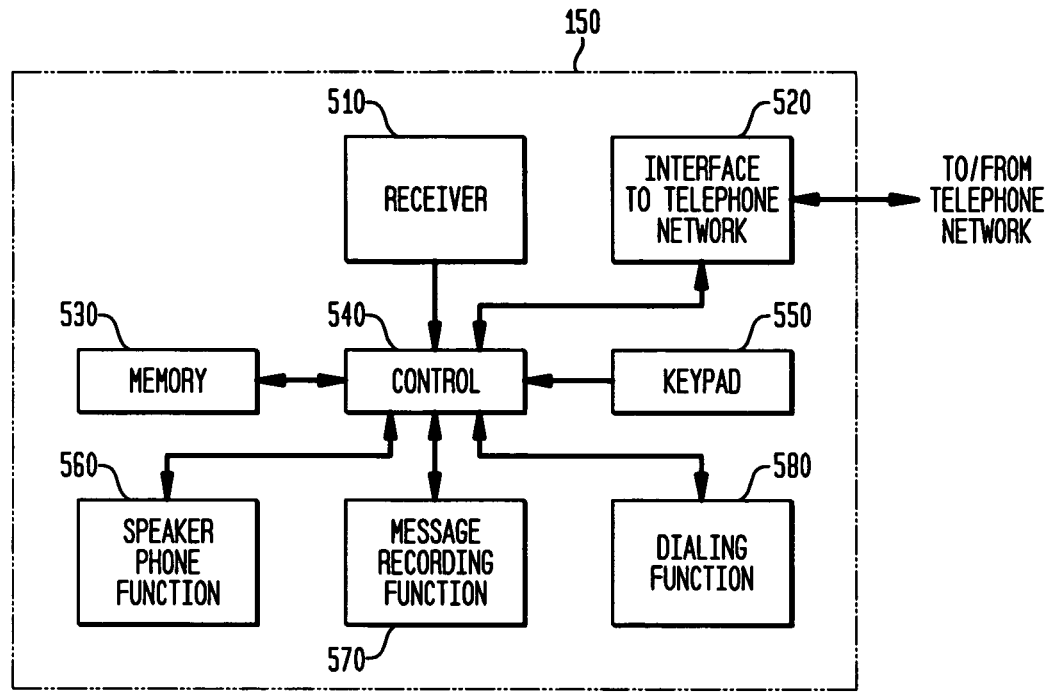
FIG. 5 illustrates an example block diagram of a telephone device according to the invention.

FIG. 5 illustrates an example block diagram of a telephone device according to the invention. As mentioned, the telephone device may include a speaker phone and/or message recording machine, and may be a standalone device or integrated, e.g., embedded, into the security system 100. The telephone device 160 includes a receiver 510 for receiving a signal from, e.g., the user-operated transmitter 160, the user interface device 140, or the control 114, that is encoded with data that identifies one or more user-specified commands to be carried out, such as answering a incoming call on a speaker phone, ending such a call, dialing a number to place a call on a speaker phone, or controlling message recording functions. The receiver 510 may receive such a signal via any type of communication path, including wired and/or wireless.

The control 540 processes the received signal to carry out the desired command by controlling, e.g., a speaker phone function 560, a message recording function 570, and/or a dialing function 580. Any type of circuitry may be used for this purpose. For example, the speaker phone function 560 can receive an incoming call by using similar circuitry as used in a conventional phone for answering a call by speaker phone. Such circuitry acts to answer the incoming call by closing the hook switch to connect the telephone to the telephone network, and activate the speaker and microphone of the speaker phone. Similarly, the call can be ended and the speaker phone disconnected by opening the hook switch to disconnect the telephone from the telephone network, and de-activating the speaker and microphone. The message recording functions 570 can be provided by using similar circuitry as used in a conventional message recording device for recording message from incoming telephone calls or recording a voice memo. Typically, the messages are recorded in a digital format. The dialing function 580 can be provided by using similar circuitry as used in a conventional telephone for dialing a number to place a telephone call. For instance, the number can be dialed by using a frequency generator to generate a different frequency or tone for each digit in the telephone number, e.g., according to the dual tone multi-frequency (DTMF) system that is recognized by the public switched telephone network (PSTN).

However, the telephone device 150 may communicate by any type of telephone network, including the PSTN, the Internet or other computer network, cell phone network, a satellite link and so forth. The interface 520 to the telephone network provides the outgoing calls in a format that can be recognized by the telephone network, while also receiving the incoming calls from the telephone network. For example, when the telephone network is the PSTN, the interface 520 may include the hook switch and frequency generator. When the telephone network is the Internet, the interface 520 may include a network interface circuit. When the telephone network is a cell phone or satellite network, the interface 520 may include a radio transmitter and receiver.

A memory 530 may be used to stored data for use by the control 540, such as instructions that are executed by the control 540. Data from the control signal received by the receiver 510 may be stored as well.

Figure 6:
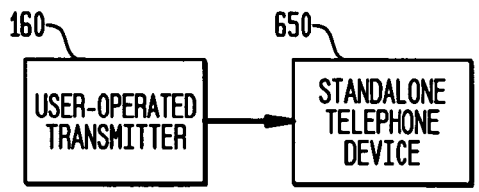
FIG. 6 illustrates an example arrangement where a user-operated transmitter controls a standalone telephone device according to the invention.

FIG. 6 illustrates an example arrangement where a user-operated transmitter 160 controls a standalone telephone device 650 according to the invention. In one possible approach, the user-operated transmitter 160 transmits a wireless signal, e.g., an RF or infrared signal, directly to the receiver 510 for controlling the telephone device 150. RF signals advantageously do not require the user-operated transmitter 160 to be aimed at the telephone device 650 and do not require a clear line of sight to the telephone device 650. In this case, the telephone device 650 is analogous to the device 150 of FIG. 5, and the receiver 510 receives the wireless signal. The standalone telephone device 650 generally is provided in its own housing that is separate from any security system since no interaction by the security system is needed.

Figure 7:
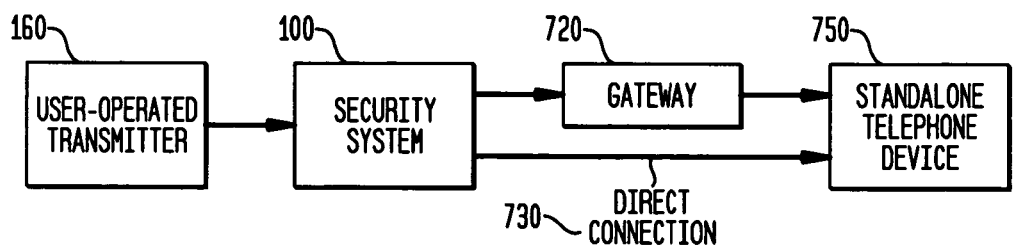
FIG. 7 illustrates an example arrangement where a user-operated transmitter controls a standalone telephone via a security system according to the invention.

FIG. 7 illustrates an example arrangement where a user-operated transmitter 160 controls a standalone telephone 750 via a security system according to the invention. The user-operated transmitter 160 transmits a wireless user-generated signal to the security system 100, such as to the control 114, as discussed previously. In one approach, the control 114 is responsive to the received signal for providing a further signal to a gateway 720 for controlling the telephone device 750. The gateway 720 includes software and/or hardware for linking the security system 100 with the telephone device 750. The gateway 720 converts the signal provided by the security system 100 into a format that can be recognized by the telephone device 750. Thus, the gateway 720 communicates on one side with the security system 100 and, on the other side, with the telephone device 750. The gateway 720 can be a separate device, or can be included in the security system 100 and/or the telephone device 750. In another approach, the control 114 is responsive to the received signal from the user-operated transmitter 160 for providing a further signal directly to the telephone device 750 for controlling the telephone device 750. In this case, the signal provided by the security system 100 is already in a format that can be recognized by the telephone device 750. Thus, the gateway 720 and direct connection 730 can be used separately or together. The telephone device 750 is analogous to the device 150 of FIG. 5, where the receiver 510 receives the signal from the control 114 either via the gateway 720 or directly from the security system 100.

Figure 8:
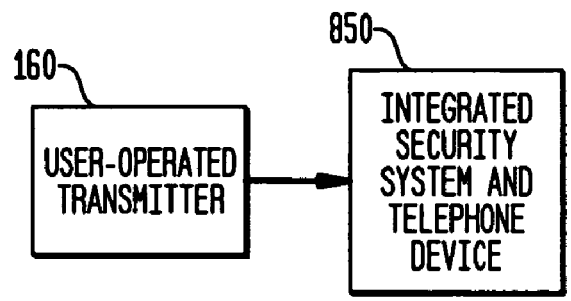
FIG. 8 illustrates an example arrangement where a user-operated transmitter controls an integrated security system and telephone device according to the invention.
Figure 9:
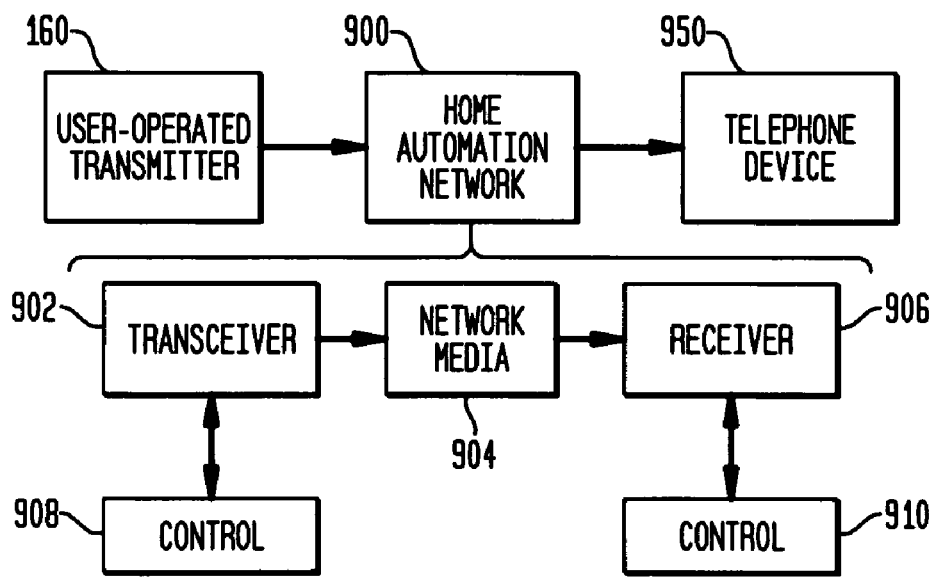
FIG. 9 illustrates an example arrangement where a user-operated transmitter controls a standalone telephone device via a home automation network according to the invention.

FIG. 8 illustrates an example arrangement where a user-operated transmitter 160 controls an integrated security system and telephone device 850 according to the invention. The integrated security system and telephone device 850 generally include the components of the control panel 110 and/or the user interface device 140, and the telephone device 150, in a common housing. The telephone device 850 is analogous to the device 150 of FIG. 5, where the receiver 510 receives the signal from the user-operated transmitter 160 directly. The Ademco Lynx, available from Honeywell Corp., is an example of an integrated security system and telephone device that can be modified to achieve the functionality described herein. In this case, a common control may be used to control both security and telephone device functions. Moreover, the circuitry for achieving the functionality described herein can be provided on a common circuit board, providing further space and cost benefits.

FIG. 9 illustrates an example arrangement where a user-operated transmitter 160 controls a standalone telephone device 950 via a home automation network 900 according to the invention. Various types of home automation networks are currently available for controlling different functions in the home, such as heating and cooling, lights, home entertainment, kitchen appliances, and computers. For example, the X10 standard uses the existing power lines in a home as a network media 904 to carry data. A transceiver 902 plugs or wires into one location in the home to send control signals to a receiver 906 which has been plugged or wired into another location in the home. A compatible device communicates with the transceiver 902 to send a control signal, while another compatible device communicates with the receiver 906 for receiving, and responding to, the control signal. For example, a wall switch may send a wireless signal to the transceiver 902 to turn a light on or off, or set a dimming level. The receiver 906 is typically connected to the light by a wired path for controlling the amount of electricity that is provided to the light. The transceiver 902 and receiver 906 include respective controls 908, 910 for achieving the desired functionality.

The present invention can take advantage of such networks as follows. For example, the user-operated transmitter 160 can be configured to transmit, to the transceiver 902, a wireless signal with a command for controlling a telephone device 950. The transceiver 902 transmits a corresponding signal to the receiver 906 via the existing power lines 904. The receiver 906 then communicates a corresponding signal to the telephone device 950 to implement the command. The telephone device 950 is analogous to the device 150 of FIG. 5, where the receiver 510 receives the signal from the receiver 906. It is also possible for a user-actuable component for providing the command, such as a keypad or switch, to be wired to the transceiver 902 rather than communicating with the transceiver 902 by a wireless signal. Various other approaches using home automation networks are possible.

Figure 10:
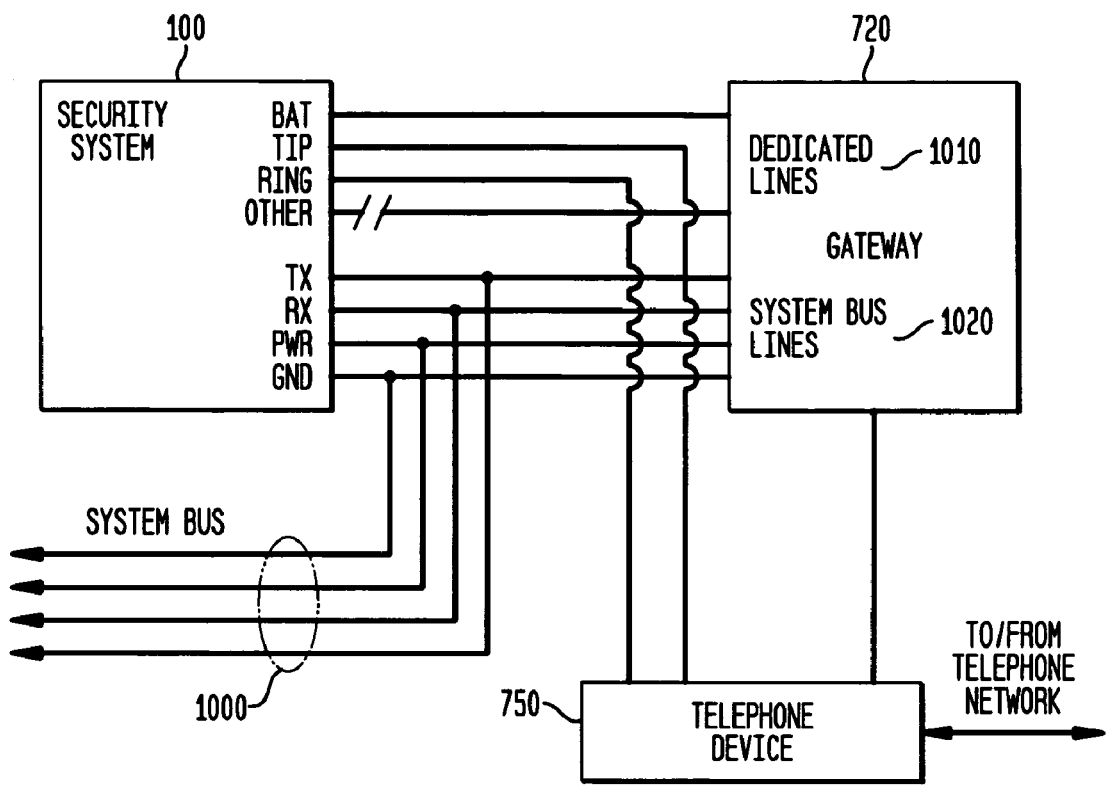
FIG. 10 illustrates details of one of the arrangements of FIG. 7 according to the invention.

FIG. 10 illustrates details of one of the arrangements of FIG. 7 according to the invention. In this approach, the security system 100 communicates with the telephone device 750 using a gateway 720 as an intermediary. The gateway 720 can be one or various peripheral devices that are connected to the security system 100. The security system 100 communicates directly with the gateway 720 via dedicated lines 1010, including a line from a battery (BAT) and other control lines (OTHER). A TIP line and a RING line communicate directly with the telephone device 750. The security system 100 also communicates with the gateway 720 via system bus lines 1020. TX denotes a transmit line, RX denotes a receive line, PWR denotes a power line, and GND denotes a ground line. The system bus lines 1020 communicate with a system bus 1000, which may connect to other peripheral devices. The gateway 720 communicates with the telephone device 750, which in turn communicates with a telephone network, as discussed previously.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A security apparatus, comprising:
   at least one control for controlling a security system that secures a building; and
   at least one receiver for receiving a first signal from a sensor in the security system, and for receiving, from a hand-held user-operated transmitter, at least one user-generated signal for controlling a telephone device and at least one user-generated signal for controlling the security system, the telephone device is provided in a standalone housing separate from the at least one receiver and the at least one control;
   wherein the at least one control is responsive to the at least one receiver for triggering an alarm when the first signal is received, and for controlling the telephone device responsive to the user-generated signal and is responsive to the user-generated signal for controlling speaker phone functions of the telephone device, said speaker phone functions includes answer an incoming telephone call, end said incoming telephone call, and dialing a number to place a call, and for a message recording functions, said message recording functions includes playing back messages, erasing messages, recording an outgoing message, and leaving a voice memo.

2. The security apparatus of claim 1, wherein said at least one user-generated signal for control the telephone device, transmitted from the hand-held user-operated transmitter, is converted by an intermediary gateway into a format that can be recognized by the telephone device to enable the telephone device to perform said speakerphone functions.

3. The security apparatus of claim 2, wherein said intermediary gateway is a standalone device.

4. The security apparatus of claim 2, wherein said intermediary gateway is integrated into said telephone device.

5. The security apparatus of claim 1, wherein:
   the at least one user-generated signal comprises a wireless signal.

6. A security apparatus, comprising:
   at least one control for controlling a security system that secures a building; and
   at least one receiver for receiving a first signal from a sensor in the security system, and for receiving, from a hand-held security system remote control device, at least one user-generated signal for controlling a telephone device and at least one user-generated signal for controlling the security system;

wherein the at least one control is responsive to the at least one receiver for triggering an alarm when the first signal is received, and for controlling the telephone device responsive to the user-generated signal and is responsive to the user-generated signal for controlling speaker phone functions of the telephone device, said speaker phone functions includes answer an incoming telephone call, end said incoming telephone call, and dialing a number to place a call, and for a message recording functions, said message recording functions includes playing back messages, erasing messages, recording an outgoing message, and leaving a voice memo wherein the telephone device, at least one receiver and at least one control are provided in a common housing.

7. A telephone device, comprising:

a first control for controlling a telephone function of the telephone device; and a receiver for receiving a first signal from a second control in a security system, the security system securing a building; wherein:

the second control is responsive to a user-generated signal received from a hand-held security system remote control device for controlling speaker phone functions of the telephone, and the first signal is provided by the second control responsive to the user-generated signal; and the first control is responsive to the first signal for controlling speaker phone functions of the telephone, wherein the first control, receiver, and the second control are provided in a common housing.

8. A telephone device, comprising:

a first control for controlling telephone functions of the telephone device; and a receiver for receiving a first signal from a second control in a security system, the security system securing a building; wherein:

the second control is responsive to a user-generated signal received from a hand-held user-operated transmitter for controlling the telephone function, and the first signal is provided by the second control responsive to the user-generated signal; and the first control is responsive to the first signal for controlling the telephone function, and the first control and the receiver are provided in a standalone housing separate from the second control.

9. The telephone device of claim 8, wherein:

said speaker phone functions includes answer an incoming telephone call, end said incoming telephone call, and dialing a number to place a call, and for a message recording functions, said message recording functions includes playing back messages, erasing messages, recording an outgoing message, and leaving a voice memo.

10. A hand-held user-operated device, comprising:

at least one user-actuable component including a telephone keypad, a call end key and keys for controlling a security system; and a transmitter responsive to the at least one user-actuable component for transmitting a user-generated signal for controlling a telephone device to at least one receiver associated with a security system that secures a building and for transmitting a second user generated signal for controlling the security system; wherein:

the at least one receiver is provided for receiving a second signal from a sensor in the security system; and the security system includes at least one control that is responsive to the at least one receiver for controlling the telephone device responsive to the user-generated signal, and triggering an alarm responsive to the second signal, the telephone device is provided in a standalone housing separate from the at least one receiver and the at least one control.

11. The hand-held user-operated device of claim 10, wherein:

the user-generated signal comprises data for controlling a speaker phone function of the telephone device.

12. The hand-held user-operated device of claim 10, wherein:

the user-generated signal comprises data for controlling a message recording function of the telephone device.

13. The hand-held user-operated device of claim 12, wherein:

the user-generated signal comprises a wireless signal.

14. The hand-held user-operated device of claim 13, further comprising:

a portable housing in which the at least one user-actuable component and the transmitter are provided.

15. The hand-held user-operated device of claim 13, wherein:

the at least one user-actuable component and the transmitter control the security system as well as the telephone device.

16. The hand-held user-operated device of claim 10, wherein:

the user-generated signal comprises data for controlling a dialing function of the telephone device.

17. The hand-held user-operated device of claim 10, further comprising a second receiver for receiving a confirmation signal from said at least one receiver associated with the security system confirming that said user-generated signal was received.

18. The hand-held user-operated device of claim 17, further comprising a notification device that is activated when the confirmation signal is received to notify a user that said user-generated signal was received by the controller.

19. The hand-held user-operated device of claim 18, wherein said notification device is a light.

20. The hand-held user-operated device of claim 10, wherein the controller identifies the hand-held user-operated device using a learned identifier prior to executing a command associated with said user-generated signal.

21. A hand-held user-operated device of claim 10, wherein the hand-held user-operated device is a television remote control.

22. A hand-held user-operated device of claim 10, wherein the hand-held user-operated device is a key fob.

23. A hand-held security system remote control device, comprising:

at least one user-actuable component including a telephone keypad, a call end key and keys for controlling a security system; and a transmitter responsive to the at least one user-actuable component for transmitting a user-generated signal for controlling a telephone device to at least one receiver associated with a security system that secures a building and for transmitting a second user generated signal for controlling the security system; wherein:

the at least one receiver is provided for receiving a second signal from a sensor in the security system; and the security system includes at least one control that is responsive to the at least one receiver for controlling the telephone device responsive to the user-generated signal, and triggering an alarm responsive to the second signal.

24. A hand-held security system remote control device of claim 23, wherein the hand-held security system remote control device is a key fob.

* * * * *